(12) United States Patent
Proctor

(10) Patent No.: US 6,530,024 B1
(45) Date of Patent: Mar. 4, 2003

(54) ADAPTIVE FEEDBACK SECURITY SYSTEM AND METHOD

(75) Inventor: Paul E. Proctor, Encinitas, CA (US)

(73) Assignee: Centrax Corporation, San Diego, CA (US)

(*) Notice: Subject to any disclaimer, the term of this patent is extended or adjusted under 35 U.S.C. 154(b) by 0 days.

(21) Appl. No.: 09/197,182

(22) Filed: Nov. 20, 1998

(51) Int. Cl.[7] .............................................. G06F 11/30
(52) U.S. Cl. ...................................... 713/201; 709/224
(58) Field of Search ................................ 713/201, 200; 709/223, 224; 706/14

(56) References Cited

U.S. PATENT DOCUMENTS

| | | | |
|---|---|---|---|
| 5,278,901 A | 1/1994 | Shiuh et al. ................. 380/4 |
| 5,361,359 A | 11/1994 | Tajalli et al. ............... 395/700 |
| 5,414,833 A | 5/1995 | Hershey et al. ............. 395/575 |
| 5,557,346 A | 9/1996 | Lipner et al. ............... 380/21 |
| 5,557,742 A | 9/1996 | Smaha et al. ............... 395/186 |
| 5,557,765 A | 9/1996 | Lipner et al. ............... 380/21 |
| 5,621,889 A | 4/1997 | Lermuzeaux et al. ....... 395/186 |
| 5,640,454 A | 6/1997 | Lipner et al. ............... 380/21 |
| 5,657,397 A | 8/1997 | Bokser ....................... 382/225 |
| 5,787,177 A | * 7/1998 | Leppek ....................... 380/25 |
| 5,991,881 A | * 11/1999 | Conklin et al. ............. 713/201 |
| 6,088,804 A | * 7/2000 | Hill et al. ................... 713/201 |
| 6,275,941 B1 | * 8/2001 | Saito et al. ................. 713/201 |
| 2001/0044894 A1 | * 11/2001 | Saito et al. ................. 713/156 |

OTHER PUBLICATIONS

"ISS lanches industry's first enterprise security decision--support application" Sep. 28, 1998, PR Newswire, Dialog text seach, file 636.*

* cited by examiner

Primary Examiner—Norman M. Wright
Assistant Examiner—Christopher Revak
(74) Attorney, Agent, or Firm—Blank Rome Comisky & McCauley LLP

(57) ABSTRACT

A system and method for managing security incidents in a computing environment uses adaptive feedback to update security procedures in response to detected security incidents. Accordingly, the system and method is capable of defining security procedures, which can include one or more policies, and implementing these security procedures on one or more computing systems in the computing environment. The system and method monitors activities in the environment and detects security incidents using the implemented security procedures. When a security incident is detected, the security procedures are updated in response to said detected security incident and implemented on one or more systems in the computing environment.

40 Claims, 10 Drawing Sheets

ADAPTIVE FEEDBACK SECURITY SYSTEM AND METHOD

BACKGROUND OF THE INVENTION

1. Field of the Invention

The present invention relates generally to computing environment security, and more specifically, to a system and method for adapting security procedures based on computing environment activity.

2. Related Art

Since the earliest days of computers, the multi-user environment has been recognized as one in which efficiencies can be gained by allowing one or more computing resources to be shared among a plurality of users. Even in the contemporary world of personal computers, a plurality of users are typically networked or otherwise connected together to allow resource sharing.

One simple example of multiple users sharing resources is a networked computing environment. In the networked computing environment, several computers or workstations are interconnected via one or more local or wide area networks (LANs or WANs) to allow the users to share network resources. In the networked computing environment, users can share network resources such as printers, modem pools, storage space, files and other resources. Users can also communicate with one another and share files electronically via local and remote e-mail.

For as long as there have been multi-user computing environments, there have been concerns regarding the security of such environments. Early security efforts were quite simple by today's standards and were often limited to point-of-entry security techniques such as requiring a valid user name and corresponding password. Hierarchical structures were implemented to control access to certain files or operations based on a user's access level.

However, as users became more sophisticated, chinks in the armor of these basic security efforts were quickly uncovered. Ill-motived users of all ages known as "hackers" quickly demonstrated the weakness of the minimal user name/password security techniques by breaking or "hacking" their way into numerous high-profile and/or sensitive computing environments. In response, system developers increased security measures. This increase in security measures was matched by corresponding advances in hacker techniques. So has the relationship between computer, or network, security administrators and hackers continued.

Access of computing resources by unauthorized hackers from the outside is not the only security concern. Also of concern are authorized users attempting to operate beyond the scope of their user authority. In many systems, there are certain files or resources for which access is restricted, or certain administrative or other operations which can only be performed by system administrators. Also, where disk space is shared, users may not be granted access to certain files of other users. Beyond these specifically restricted operations, there may be certain activities of authorized users that may be deemed inappropriate, or may be indicative of inappropriate activities. For example, a user accessing and copying a large number of files may indicate that the user is attempting to abscond with important proprietary information. Thus, the security concerns include effectively restricting an authorized user to have access to files or to perform operations within his or her authority.

SUMMARY OF THE INVENTION

The present invention is directed toward a system and method for providing enhanced security features to a computing system such as, for example, a networked computing environment. According to one aspect of the invention, a security policy system allows the creation and implementation of one or more security procedures. These procedures can include, for example, audit policies, collection policies, detection policies, and security policies.

An audit policy is defined and implemented in a networked computing environment to define or identify activities of, or occurrences from, a user, or group of users, to be audited. The auditing performed can include monitoring the networked computing environment for the occurrence of the identified activities for the users or groups of users. The auditing can also include logging the occurrences of audited events. In one embodiment, the occurrences of audited activities or events are recorded in one or more event log files.

A collection policy identifies the frequency with which audited data, or events, are collected and provided to a detection subsystem. The collection policy sets forth the schedule by which audited events are collected from the auditing engine and provided to a detection engine.

A detection policy defines how the audited activities are analyzed to detect a security occurrence. The term security occurrence is used to refer to the occurrence of: one or more instances of an actual or attempted security breach; a potential security breach; suspect, unauthorized, or abnormal activity in the networked computing environment; or out-of-the-ordinary activities or a predefined condition which may indicate a security breach or unwanted activity is being attempted. In one embodiment, the detection policy can identify threshold settings, trigger levels or ranges for the audited activities so that security occurrences can be identified from the collected occurrences of audited activities.

A security policy defines the security practices of one or more resources in the computing environment. For example, the security policy may define criteria such as the number of unsuccessful logon attempts allowed before a system is shutdown or a user's ID is invalidated, the aging of passwords, the size and type of passwords, the level of access granted to guest users, and so on.

In a computing environment such as, for example, a networked computing environment, a security or system administrator can define the initial security procedures for the computing environment. These can include a definition of one or more of audit policies, security policies, detection policies and collection policies. The definition is usually made based on the level of security desired for the network, considering the overhead associated with monitoring network activities and detection of security occurrences.

According to one aspect of the invention, when a security occurrence is detected, one or more of the policies that make up the security procedures can be modified and the modified policy or policies implemented in the computing environment. According to this adaptive feedback aspect of the invention, policies can be adaptively updated and the updated policies implemented in the network. The updates can be made based on security concerns or procedures in general, or based on an identification of the user or users associated with one or more detected security occurrences.

Additionally, information relating to the type of security occurrence detected can be used in updating and implementing the one or more policies in the computing environment. In one embodiment, the updates to the policies that make up the security procedures can be fully automated such that no intervention by an administrator is required. Alternatively, alerts to an administrator can be provided such that an administrator can be asked to provide feedback or other input to control, monitor or approve the updating of the security procedures.

In another embodiment of the invention, a security or network administrator can establish predefined levels of security upgrade based on the security occurrences detected. In this embodiment, when the security occurrence is detected, one or more of the security procedures are updated to a higher predefined level. According to yet another aspect of the invention, each of the individual security procedures can be set to have a stepwise or incremental increase in security level. Security procedures can also be set to increase to a maximum defined security level upon the detection of a security occurrence. The monitoring, detecting, and policy updating can continue to occur in a cyclical fashion, depending on the circumstances surrounding the security occurrence(s), until some predefined limit or limits are reached, or until an administrator or other authorized personnel intervenes.

One advantage of the invention is that security procedures, including one or more of the associated policies, can be updated automatically upon the detection of a security occurrence. Such an update can be accomplished at a predetermined level and without user intervention.

Another advantage of the invention is that the updates to the policies that make up the security procedures can be determined based on an identification of the user or users associated with detected security occurrences. The updates can also be made based on an identification of the types of activities indicated by the detection of the security occurrences. As such, security procedure updates and implementations can be made based on actual or perceived needs and tailored to specific occurrences. As such, system performance degradation, which would otherwise occur as a result of shifting to a maximum security procedure, can be avoided.

According to another aspect of the invention, custom audit policies can be defined to identify one or more users or groups of users, one or more activities or occurrences associated with the identified users or groups of users, and other activities or occurrences to be audited. One advantage of the custom audit policy is that wild card designators can be used to allow activities or occurrences relating to particular files or types of files to be tracked across a number of diverse computer architectures, irrespective of the specific file structure implemented thereon.

In this document, the term "user" is used to refer to one or more users or groups of users, whether authorized or unauthorized. The term "security administrator" refers to a user having rights to oversee or adjust the security aspects of all or part of the computing environment and can include, for example, a system administrator or a network administrator.

DETAILED DESCRIPTION OF THE PREFERRED EMBODIMENTS

1. Introduction and Overview

The present invention is directed toward a system and method for providing enhanced network security. According to the invention, several enhanced computing environment security aspects can be provided individually, or in combination. According to one aspect of the invention, a system and method are provided for creating security procedures for a computing environment. According to another aspect of the invention, a system and method are provided for allowing adaptive feedback in the creation and implementation of a security system for a computing environment.

Generally speaking, in one embodiment of the invention, security procedures for a computing environment can be created and implemented within the computing environment. The security procedures may define, for example, audit policies, collection policies, security policies, and detection policies. If the system determines that a potential security breach is attempted or has occurred, the currently implemented policy or policies are updated and the newly updated policies implemented.

2. Example Environment

Before describing the invention in detail, it is useful to describe a simple example environment in which the invention can be implemented. One such example environment is a networked computing environment comprising a plurality of computers, workstations or other processor-based systems interconnected by a communications interface such as, for example, a computer network or other interface.

Figure 1:
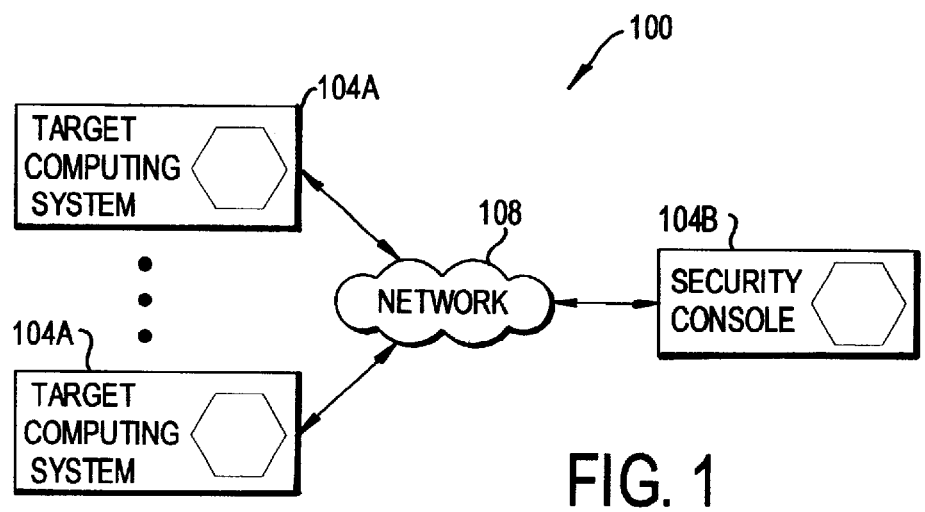
FIG. 1 is a block diagram illustrating an example networked computing environment according to one embodiment of the invention.

FIG. 1 is a block diagram illustrating an example networked computing environment according to one embodiment of the invention. Networked computing environment 100 according to this example includes a plurality of networked computers 104 interfaced via a network 108. Network 108 can be implemented utilizing one or more local area networks (LANS), wide area networks (WANS) or other connection techniques or communication technologies. Note that one or more computers 104 can also be interfaced to network 108 via an external dial-up communication link, or other external link. Although not illustrated, the networked computing environment can also include network resources such as printers, scanners, modem pools, storage devices and other resources.

The invention is described herein in terms of this example networked computing environment 100 and an example application in this example environment. Description in these terms is provided for ease of discussion only. After reading the description herein, it will become apparent to one of ordinary skill in the art that the present invention can be implemented in any of a number of different computing environments.

3. Computing Environment Security System

In one embodiment of the invention, one of the computers 104 in the networked computing environment 100 is designated as performing network security-related functions. In the example illustrated in FIG. 1, this computer 104 is illustrated as a security console 104B. In one embodiment, security console 104B is responsible for performing security operations related to the security of the networked computing environment 100. The security operations can include, for example, operations such as preparing and updating security procedures and administering the security monitoring on the network.

Computers to which the security procedures are applied are referred to in this document as target computers 104A, or target workstations. It is uses of and activities conducted through target computers 104A that are monitored for security occurrences. Security procedures can also be applied to security console 104B. In other words, security console 104B can also be a target computer.

In one embodiment, the security procedures can include, for example, one or more of security policies, collection policies, detection policies and audit policies. The security console 104B can also perform the adaptive feedback operations, including updating the security procedures based on security occurrences.

In one embodiment, security console 104B is a dedicated machine, devoted to performing security-related operations. In an alternative embodiment, security console 104B can also be utilized to perform other computing functions in networked computing environment 100. Also note that, as described below, certain functions of the invention can be performed on one or more of the plurality of computers or workstations 104 in addition to a security console 104B. It is important to note that security console 104B can also be a target computer 104A.

4. Creation of Security Procedures

Figure 2:
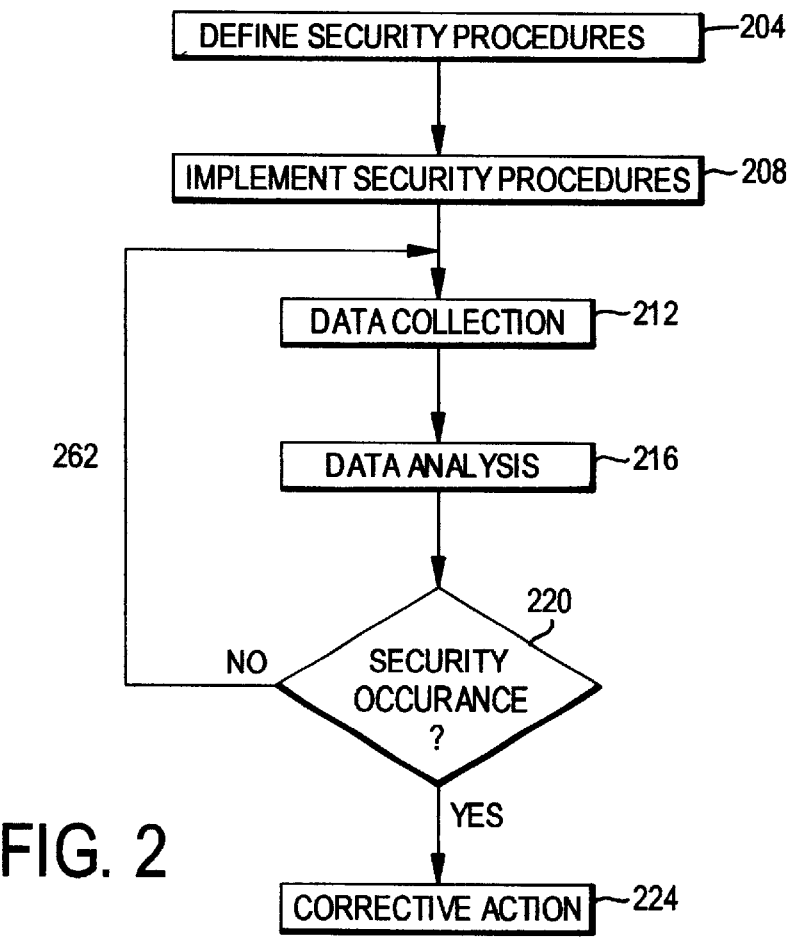
FIG. 2 is an operational flow diagram generally illustrating the creation and implementation of security procedures in a networked computing environment according to one embodiment of the invention.

As stated above, on aspect of the invention is the creation of security procedures for the computing environment. FIG. 2 is an operational flow diagram generally illustrating the creation and implementation of security procedures in a computing environment, such as networked computing environment 100, according to one embodiment of the invention.

Referring now to FIG. 2, in a step 204, an administrator defines security procedures on security console 104B. Security procedures can include one or more security-related policies implemented on the network. Examples of such security-related policies can include, for example, audit policies, security policies, detection policies and collection policies.

Audit policies, which at a general level are generally known in networked computing security, are policies that define activities to look for or monitor in the networked computing environment. In other words, the audit policy defines what activities of a user or users are to be audited. In this regard, audit policies can be thought of as defining or specifying data to be gathered. Audit policies can define users, actions and objects, when defining data to be gathered.

An audit policy is perhaps best described by way of example. In one example, an audit policy may be used to define or delineate one or more users for whom data should be gathered, and may specify operations of those users for which data should be gathered.

As just one specific realization of this example, an audit policy may be implemented to define data to gather on one or more users modifying an executable file. Another specific example may be to define the auditing of activities by certain users attempting to access certain files for which they do not have access privileges. While these examples generally illustrate the concept of audit policies, these examples should not be interpreted to limit the definition thereof. Audit policies are described in greater detail below.

In a step 208, the security procedures defined in step 204 are implemented in the computing environment. In one example implementation, agents 112 running on target computers 104A gather data in accordance with the audit policy. For example, agents 112 on target computers 104A may gather events on any read, modify and write operations, or attempted operations of one or more users on target computers 104A as specified in the audit policy. In one embodiment, as discussed below, collected data on activities or operations is logged in an event log file. In one embodiment, the event log file is maintained locally at target computers 104A. In alternative embodiments, the event log file is maintained at security console 104B, or some other independent network entity. In one embodiment, agents 112 on target computers 104A can also monitor the operations of users on target computers 104A in accordance with the implemented procedures. However, as discussed below, monitoring and detection are preferably performed at a security console 104B.

At periodic or other time intervals, data gathered in one or more log files is collected in a data collections step 212. A collection policy can be implemented to define the collection times or other collection parameters.

In a step 216, the data collected in step 212 is analyzed. In one embodiment, the analysis is performed by agents 112 implementing a detection policy. In this step, the agents 112 analyze one or more events from one or more event log files. The data analysis can be performed by agents 112 on target machines 104A or by agents 112 on a security console 104B. In the data analysis step, occurrences logged in the event log file are reviewed, with respect to the detection policy, to determine whether any security breaches have been attempted or have occurred. For example, the data analysis step may look at patterns for particular users, or look to determine whether a number of occurrences has exceeded a predefined limit.

If the data analysis determines that a security incident has occurred, or was likely attempted, a security response action may be taken. This is illustrated by steps 220 and 224. If, on the other hand, it is determined that a security incident has not been committed or attempted, the data collection and analysis steps continue as illustrated by flow line 262.

The security response action taken in step 224 can include, for example, shutting down a target computer 104A, logging off a particular user who is suspected of committing or attempting a security breach, minimizing access granted to a suspected user, or other appropriate or desired action. However, in one embodiment or in certain applications of the invention, it may not be desired or desirable to take such immoderate steps immediately. Thus, in one embodiment, the security response action taken in step 224 can include a step of updating the security procedures defined in step 204, and implementing these updated procedures.

The updated procedures can be implemented to perform, for example, a more thorough or increased audit of the user or users involved in the security occurrence, or otherwise suspected of committing or attempting to commit a security breach. For example, in one application of the invention, where a user is suspected of committing or attempting to commit a security breach, the audit policy may be amended to instruct agents to detect and log every read and write file operation performed or attempted by that particular user or group of users. Thus, in this manner, a more complete record of the user's or users' activities can be made and a better assessment of the motives behind those activities.

Of course alternative applications can be implemented where other changes are made to the security procedures to obtain more information about the suspect user or to further restrict his or her access or activities. Generally, the audit policy may be updated to obtain more information about the user's activities on the network, the collection policy may be updated to collect user events more frequently, and the security policy may be "tightened" via the detection policy to have a lower threshold or to more strenuously analyze and flag suspect activities. The adaptive feedback system can similarly be implemented to allow "relaxation" of the security procedures based on recent network activity. In one embodiment, however, such relaxation is not permitted to occur automatically, and requires administrator approval or manual relaxation.

5. Security Procedures

Figure 3:
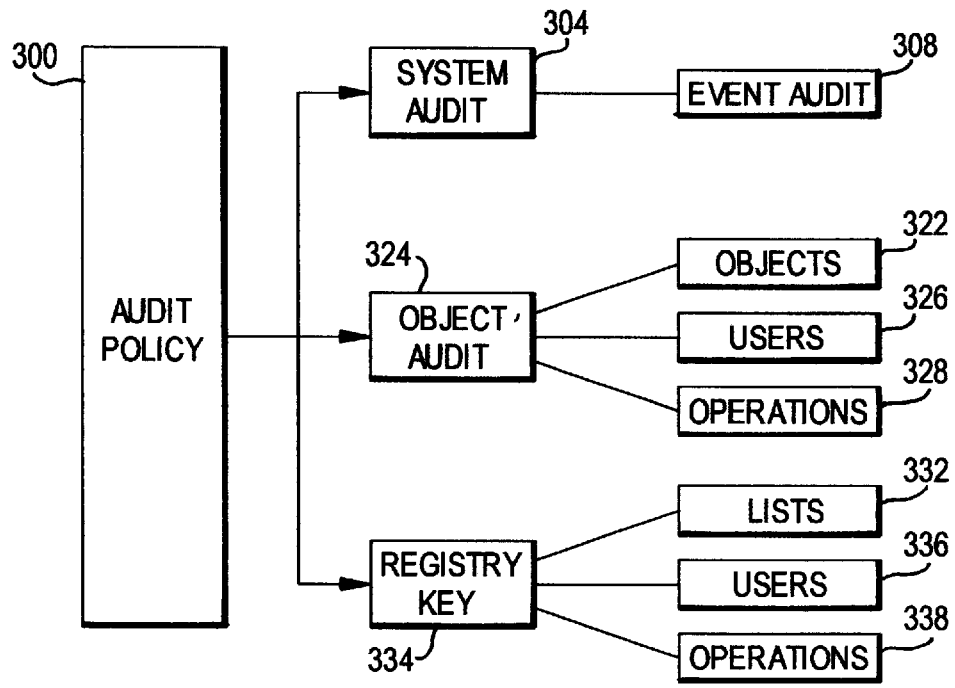
FIG. 3 is block diagram illustrating an example implementation of an audit policy in accordance with one embodiment of the invention.

As described above, one part of a security procedure can include audit policies. Audit policies, briefly introduced above, are discussed now in greater detail. FIG. 3 is block diagram illustrating an example implementation of an audit policy in accordance with one embodiment of the invention. In the example embodiment illustrated in FIG. 3, the audit policy 300 includes a system audit 304, an object audit 324, and a registry key audit 334. As would be understood by one of ordinary skill in the art after reading this description, additional or alternative audit areas can be defined and implemented.

According to one aspect of the invention, system audit 304 defines an event audit 308 that audits one or more identified events occurring in the system. Object audit 324 can include an identification of one or more objects 322 to which the audit pertains, a user or users 326 whose activities should be audited with respect to identified objects, and operations 328 performed or attempted on the identified object or objects. One example of an object is a file, although other objects can be identified for audit.

Registry key audit 334 can include an identification of a list 332 of one or more registry keys to be audited, a user or users 336 whose activities should be audited with respect to identified files, and operations 338 performed or attempted on the identified registry keys.

Figure 4:
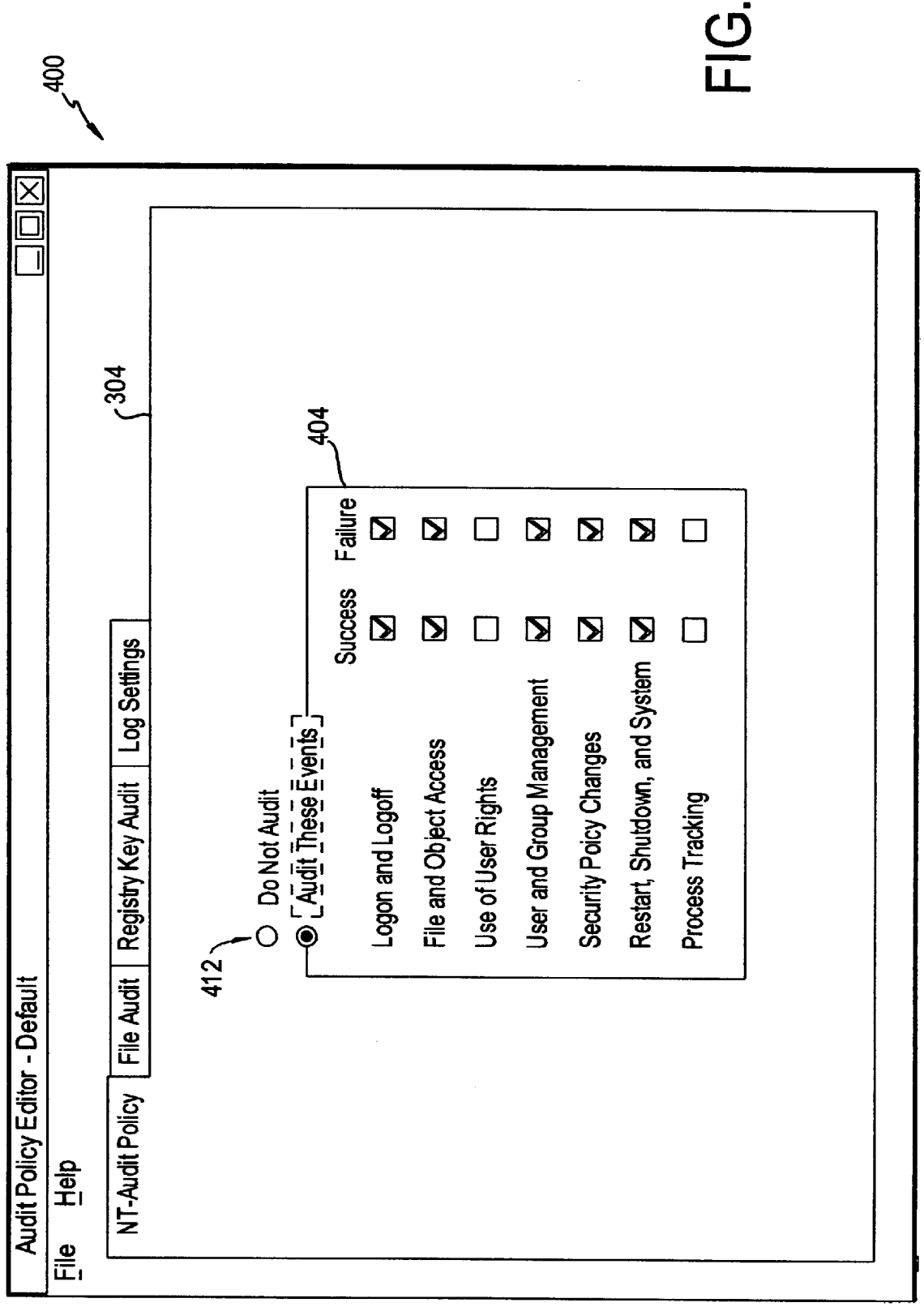
FIG. 4 is a diagram illustrating an example user interface that can be provided to define an audit policy in accordance with one example implementation of the invention.

FIG. 4 is a diagram illustrating an example system audit screen 400 in accordance with one example implementation of the invention. Referring now to FIG. 4, system audit screen 400 defines a plurality of audit events. In accordance with this example implementation, system audit policy 304 can conduct or define audits to determine the occurrence of the success and/or failure of certain activities. Examples of these activities according to the illustrated embodiment are outlined in window portion 404. Included in the illustrated example are log on and log off events, file and object access events, use of user rights events, user and group management events, security policy changes, restart, shutdown, and system events, and process tracking events. Additionally, the administrator defining the audit policy may choose not to audit any events as illustrated by a DO NOT AUDIT button or selection 412.

Figure 5:
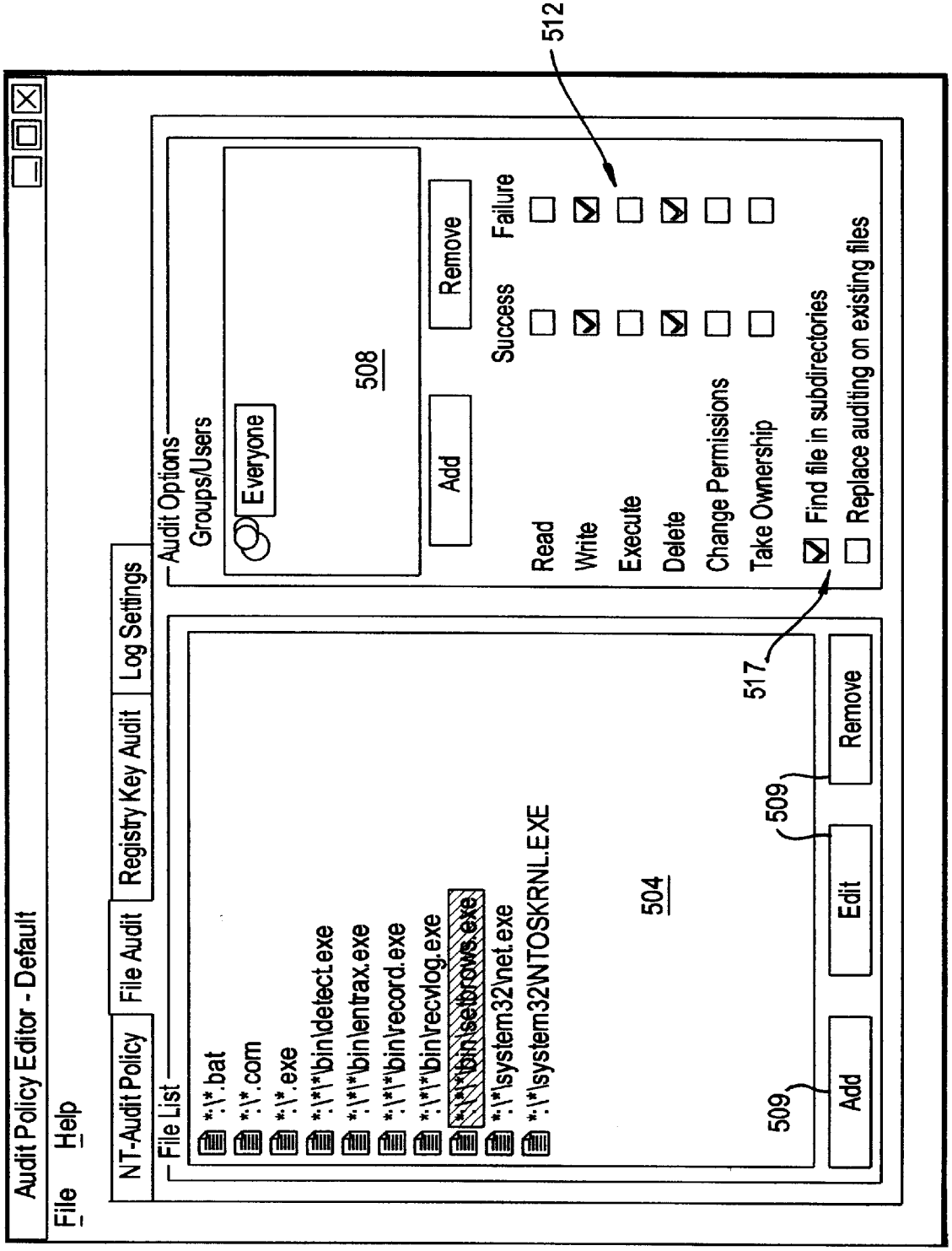
FIG. 5 is a diagram illustrating an example user interface that can be provided to define a file audit of an audit policy according to one example implementation of the invention.

Returning now to FIG. 3, an object audit 324 can include an audit of objects 322, users or groups of users 326, and one or more operations 328. One example implementation of creating an object audit is illustrated in FIG. 5. In the example illustrated in FIG. 5, a display screen for implementing a file audit 324 of an audit policy according to one example implementation of the invention is illustrated. File list window portion 504 provides a list of files that can be selected for auditing. One or more computer directories can be scanned to display in window portion 504 a list of files that are candidates for potential auditing. Add, edit and remove buttons 509 can be used to create and modify a list of files to be audited.

In one embodiment of the invention, a wild card such as, for example, an asterisk (*) can be used to facilitate file selection. For example, in some networked computing environments it is foreseeable that a particular file desired to be audited may not reside in the same directory in the one or more target computers 104A. As such, a wild card feature allows that file to be specified regardless of its path or directory in each of the target computers 104A. As an additional example, if it is desired to identify for audit all executable files (e.g., files having the .exe extension), a wild card such as *.exe can be specified to identify all executable files. The wild card can be any character designated as being a wild card, but is preferably an asterisk (*). The wild card can be used as a wild card in one or more characters of file names, or as a wild card in one or more locations in the directory or tree structure of a file, or both.

Groups/users windows 508 can be utilized to select or identify one or more users or groups of users as targets for the audit. In one embodiment, one or more predefined groups can be created to facilitate identification of users. In the example illustrated in FIG. 5, a single group titled "EVERYONE" is illustrated. Although the functionality is not illustrated on the screen diagram of FIG. 5, the functionality can be provided in one embodiment to allow the administrator to create and edit custom groups.

The operations 328 that can be edited in the example implementation of FIG. 5 are illustrated in window portion 512. In this example, these include success and/or failure of read operations, write operations, execute operations, delete operations, change-permission operations, and take-ownership operations. Thus, as illustrated by the example implementation of FIG. 5, the administrator can specify particular files or groups of files, users or groups of users, and operations or group of operations for audit purposes. Additionally, the administrator can select whether to replace auditing on subdirectories, and whether to replace auditing on existing files as illustrated by selection boxes 517.

Figure 6:
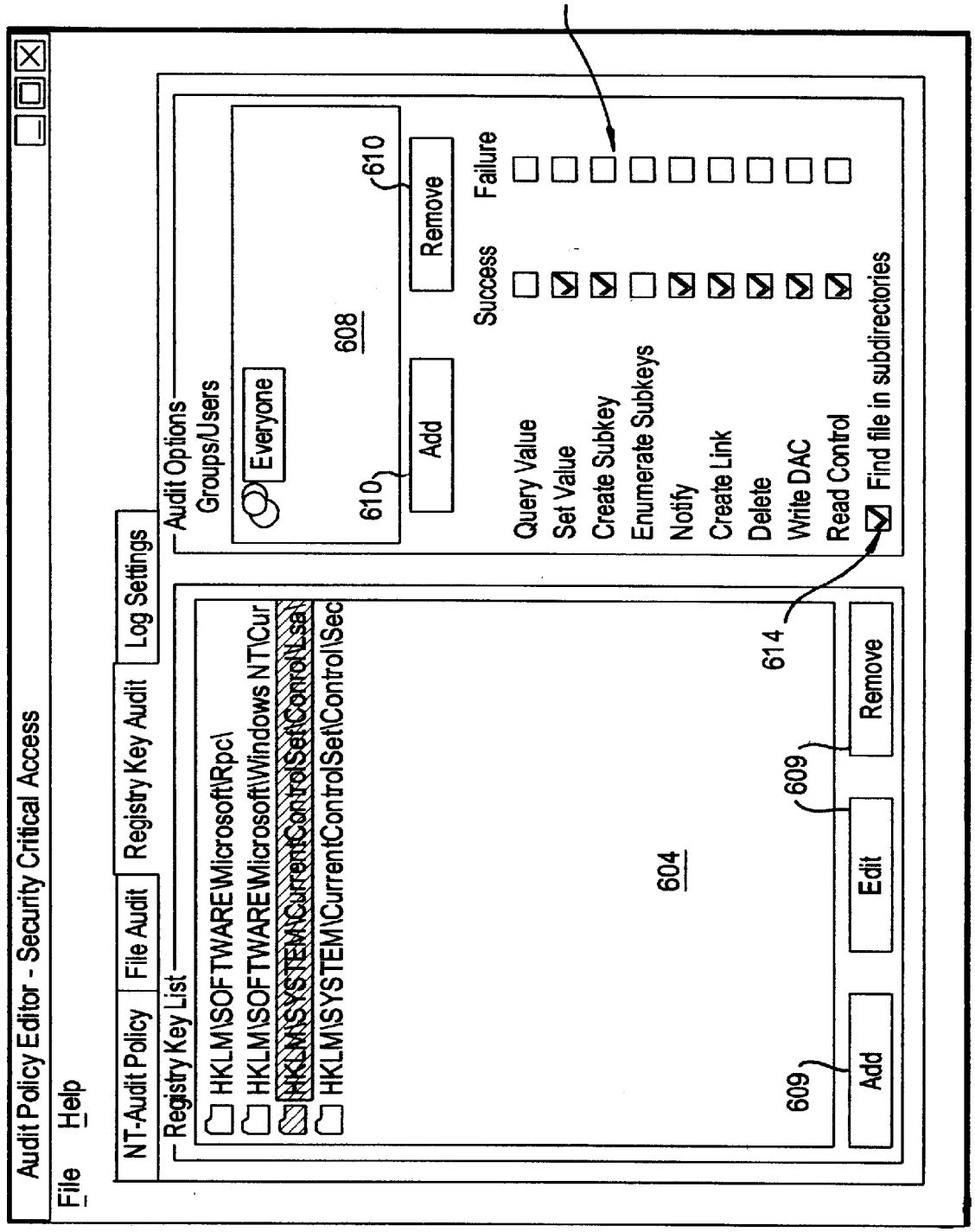
FIG. 6 is a diagram illustrating an example user interface that can be provided to define a registry key audit according to one embodiment of the invention.

Returning now to FIG. 3, registry key audit 334 can include registry key lists 332, users and/or groups 336, and operations 338. FIG. 6 is a diagram of a computer screen illustrating an example implementation of a registry key audit according to one embodiment of the invention. Registry key list window portion 604 allows a selection of one or more registry keys for the system of interest. Add, edit and remove buttons 609 can be used to update and create the registry key list. Similar to the file audit policy illustrated in FIG. 5, groups/users window 608 allows selection of one or more users or groups of users for the registry key audit. Add and remove buttons 610 can be used to create and modify the list. Operations that can be selected for registry key audit in the example implementation can include success and/or failure of a query value, a set value, a create sub key, enumerate sub keys, notify, create link, delete, write, discretionary access control (DAC), and read control. Additionally, the administrator can select whether to replace auditing on existing sub keys as illustrated by selection box 614.

FIGS. 3, 4, 5, and 6 described above provide an example implementation for creating and administering an audit policy 300 in accordance with one embodiment of the invention. After reading this description, it will become apparent to one of ordinary skill in the art how alternative implementations for audit policies can be utilized in accordance with the present invention. These alternatives can include, without limitation, alternative system events for auditing, alternative objects for auditing, alternative screen layouts, and alternative features/options provided.

Collection policies are policies that set forth the specific details on how or when the auditing information is to be collected. As stated above, the information from the performed audits is placed in one or more event log files. In this example, the collection policy may indicate a collection schedule for collecting audit information from the one or more event log files. One overall schedule can be provided for all of the event log files, or individual event log files or subsets of event log files can be established to provide flexibility. In one embodiment of the invention, the collection policy provides a 24 hour, 7 day a week calendar that can be used to establish a collection schedule.

Figure 7:
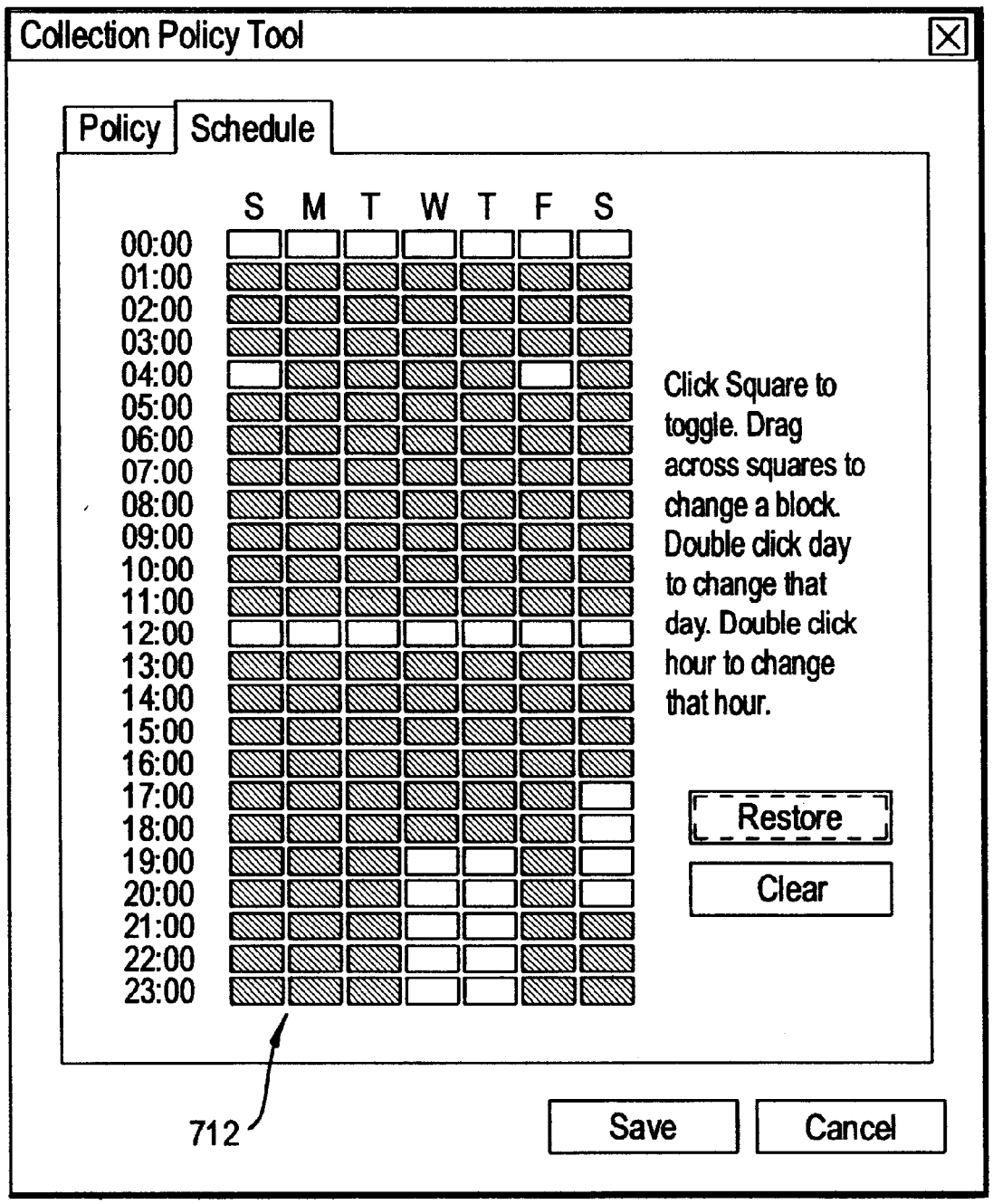
FIG. 7 is a diagram illustrating an example user interface that can be provided to define a collection policy according to one embodiment of the invention.

FIG. 7 is a diagram illustrating an example implementation for a screen layout used by an administrator to define the collection policy. In the illustrated example embodiment, the calendar provides a screen having 24 boxes 712 for each day, one box 712 for each hour. The administrator can use a mouse or other pointing device to select one or more boxes to identify a collection time. For example, the administrator may choose to collect the audit data from all systems twice daily, once at 4 PM and once at 12 noon. The administrator may identify a different collection schedule for each day, or may identify different schedules for weekdays and weekends.

In one embodiment, the administrator can click on a box 712 to select that box 712 as a collection time for that day. Alternatively, the administrator can double click on a time to select every day at that time, or double click on a day to select every time for that day. Additionally, the user can click and drag the pointer across several squares 712 to toggle a group or block of squares on or off.

Regardless of the tool provided or screen layout used to select collection days and times, the collection policy establishes when the audited data is to be collected by the security system. As would be apparent to one of ordinary skill in the art after reading this description, alternative collection techniques can be employed to allow collection of audit data at desired times or intervals.

The detection policy can be used to identify that a security occurrence has occurred. In one embodiment, the detection policy is used to establish thresholds or limits which, when reached, trigger an alarm or other condition indicating that a security breach, attempted security breach, or other network security condition has occurred or is occurring. For example, the detection policy may be established to raise a flag after a predetermined number of unsuccessful log-in attempts for a particular user name. As this example illustrates, thresholds, limits or ranges can be set for one or more of the plurality of audit parameters to raise flags, which potentially could result in an upgrade or update of the security procedures.

The security policy can include security settings or values, which define the security of the system. The security policy can define parameters such as, for example, minimum and maximum password age, minimum and maximum password length, password uniqueness, account lockout, reset account time frames, lockout durations, forced log outs, user log ons to change password, and other security policies.

Figure 8:
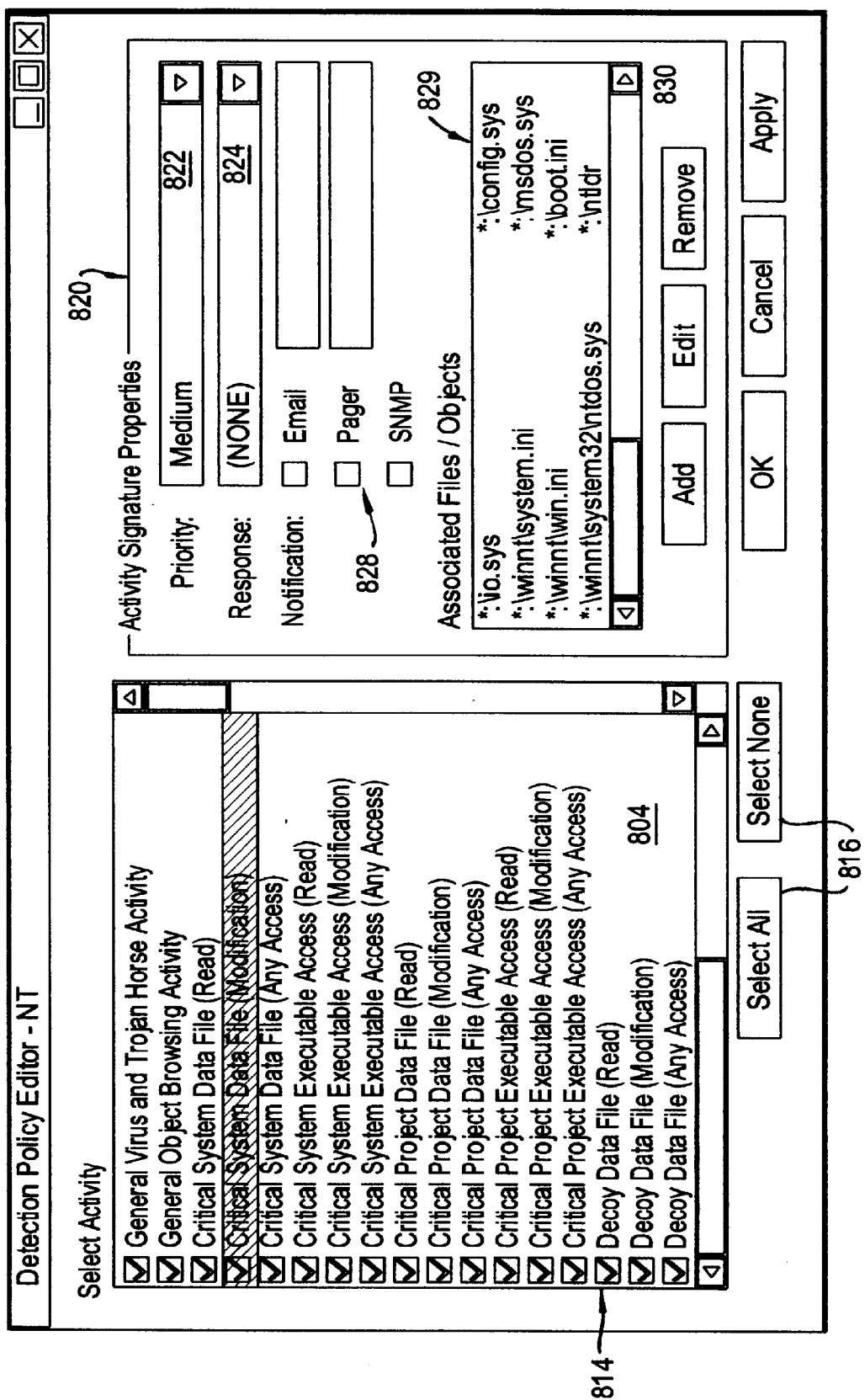
FIG. 8 is a diagram illustrating an example user interface that can be provided to define a detection policy according to one embodiment of the invention.

FIG. 8 is a diagram illustrating an example implementation of a window for implementing a detection policy according to one embodiment of the invention. In the example illustrated in FIG. 8, a plurality of activities or activity types are listed in window portion 804. Check boxes 814 are provided so that one or more of these listed activities can be selected by the administrator. Check boxes 816 allow selection of all or none of the listed activities in a single click. Table 1 is a listing of several examples of activities that can be included as activities to watch in implementing a detection policy. Also illustrated in the example provided in FIG. 8 is an activity signature properties window 820. In this window the activity priority can be set (HIGH, MEDIUM, or LOW) as illustrated by click down window 822. Also illustrated in this example, the response to a detected activity can be set in click down window 824. In one embodiment, these selections can include as responses that can be selected: no response, log off user, shut down system, disable account, or upgrade procedures.

In area 828 the administrator can select how he or she should be notified. The example illustrated includes check boxes for e-mail, pager, and SNMP (Simple Network Management Protocol). Also provided are windows to enter the administrator's e-mail address and pager number where appropriate.

Also provided in the illustrated example is a window portion 829 listing files associated with a selected activity. In this example, when the cursor is used to highlight an activity, a list of the files or objects generally audited to detect an occurrence of the highlighted activity appears in window portion 829. Edit buttons 830 allow the list of files or objects to be edited.

Thus, in summary, the audit policy dictates the types of data and occurrences that are to be monitored and collected; the collection policy dictates the frequency and amount of collection; the detection policy sets ranges, thresholds, or trigger levels to find a network security occurrence; and the security policy provides settings for handling various security procedures and occurrences. The examples described above with reference to the illustrated screen layouts are provided by way of example only and not limitation. After reading this description, it will become apparent to one of ordinary skill in the art that alternative implementations are possible, and that the invention is not limited to the examples disclosed herein.

6. Updating the Security Procedures

As stated above, when unusual or suspect activity is detected in the networked computing environment, one or more security procedures can be updated and implemented in the network.

The manner in which the one or more security procedures are updated and implemented is now discussed in more detail in accordance with one or more embodiments of the invention. When analysis of the gathered and networked information indicates a security occurrence (i.e., one or more users, or an unauthorized user has performed a security breach, or apparently attempted a security breach or other unauthorized activity), the security procedures can be updated manually, automatically, or by a combination thereof. In one embodiment of the invention, the security procedures can include audit policies, collection policies, detection policies, and security policies.

Figure 9:
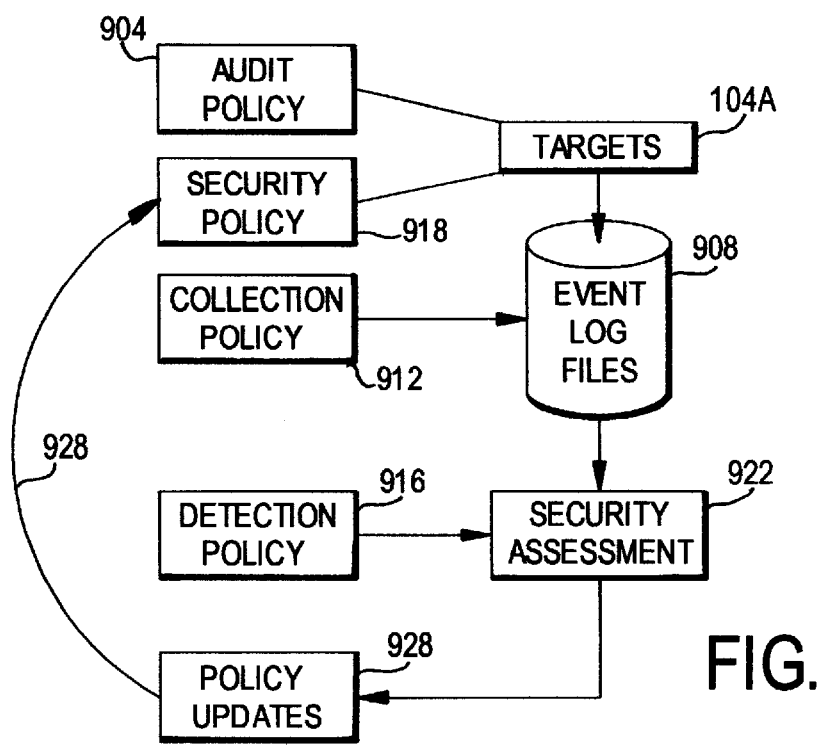
FIG. 9 is a block diagram illustrating an example interaction of various policies that can be implemented to make up a security procedure, the assessment of data in accordance with security procedures, and updating security procedures, in accordance with one embodiment of the invention.
Figure 10:
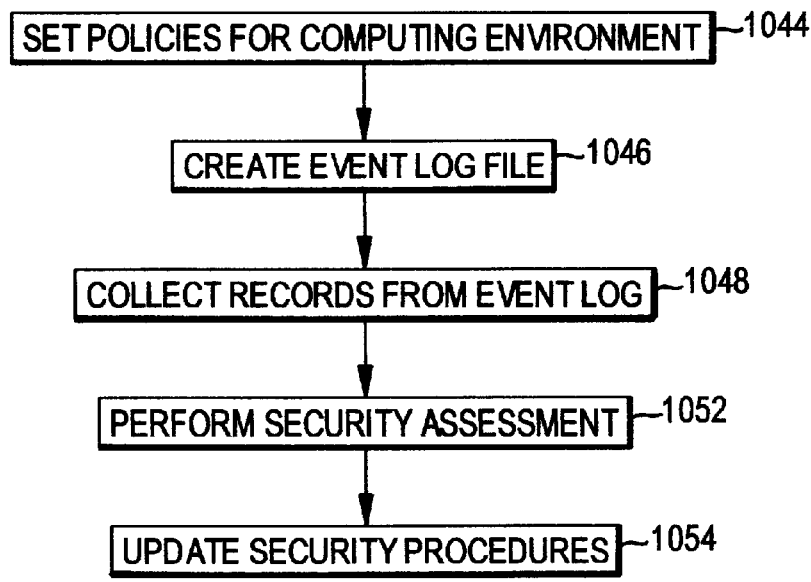
FIG. 10 is an operational flow diagram illustrating an example process for implementing and updating policies in accordance with one embodiment of the invention.

FIG. 9 is a block diagram illustrating the interaction of the various policies that can be implemented to make up this security procedure, the assessment of data in accordance with security procedures, and the updating of security procedures in accordance with one embodiment of the invention. FIG. 10 is an operational flow diagram illustrating the process of implementing and updating the policies according to one embodiment of the invention. Referring now to FIGS. 9 and 10, in this example embodiment, the security procedures include an audit policy 904, a collection policy 912, a detection policy 916, and a security policy 918. In a step 1044, audit policy 904, collection policy 912 and detection policy 916 are implemented within networked computing environment 100 to monitor and handle security-related items. In one embodiment, audit policy 904 provides an application running on one or more target systems 104A to perform the identified audit.

In accordance with the audit policy specified for a target 104A, one or more event log files 908 are generated and recorded indicating the various audited activities occurring within the target 104A. This is illustrated by a step 1046. In one embodiment, event log file 908 can be kept locally at each target 104A to collect records for that target 104A. Alternatively, one or more event log files 908 can be kept centrally such as, for example, at a security workstation 104B, or at one or more targets 104A.

In a step 1048, the implemented collection policy 912 results in the collection of the records in event log files 908 at the scheduled intervals. The collected records are provided to the security system for analysis. This analysis is referred to as a security assessment 924. In a step 1052, the security assessment is performed based on the audited activities that have been recorded in event log files 908. The security assessment is performed in accordance with the detection policy or policies 916 established for the network, or for that user or workstation.

When security assessment 924 determines that an actual, attempted or potential security breach has occurred or is occurring, one or more policy updates 928 are made to one or more of the audit policy 904, collection policy 912 and detection policy 916. This is illustrated by a step 1054.

Figure 11:
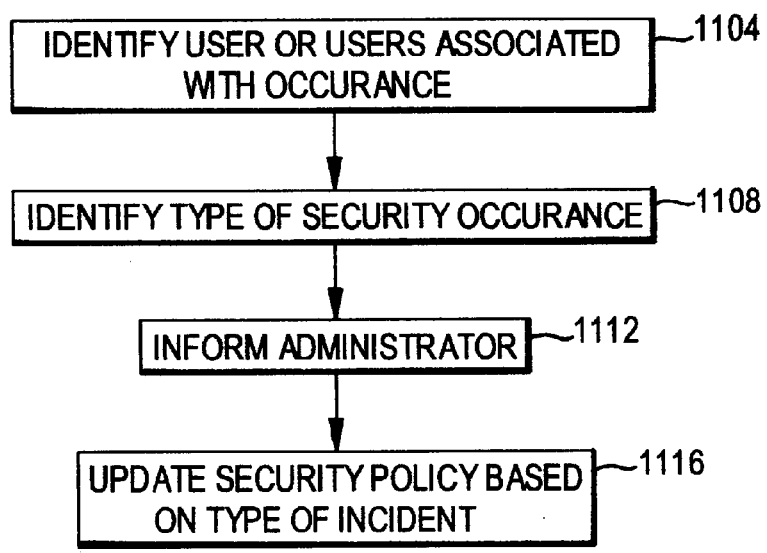
FIG. 11 is an operational flow diagram illustrating an example process for updating security procedures in accordance with one embodiment of the invention.

FIG. 11 is an operational flow diagram illustrating an example of how the security procedures can be updated in accordance with one embodiment of the invention. In a step 1104, the user or group of users associated with the potential security breach are identified. As described, this identification can come from the audited information in which activities for a user or groups of users are tracked and recorded according to the defined user or groups of users.

In a step 1108, the type of breach or potential breach is identified. For example, there may be one or more activities that have been detected as a result of the audited events. In this step, the types of activities are identified and if possible, grouped to indicate the type of breach attempted or effected. For example, the occurrence of several failed log in attempts from one or more user names may indicate that one or more individuals are attempting to hack their way into the system. As another example, the occurrence of a large number of open and copy operations from a particular user may indicate that that user is attempting to copy a large number of files in preparation for stealing information from the networked computing environment 100.

Note that in one example described above with reference to FIG. 8, an activity identified in the detection policy is detected as having occurred. In this example embodiment, the type of security occurrence is inherently identified.

In a step 1112, a security administrator or other identified network administrator is informed of the potential or actual security breach. Preferably, this information includes the identification of the user or group of users associated with the potential breach as identified in step 1104, as well as the type of security occurrence as identified in step 1108. In one embodiment, the security administrator can request and be provided with a listing of the appropriate records in the event log file that were used in arriving at the information obtained in steps 1104 and 1108.

In one embodiment, these records can be provided in accordance with the techniques described in co-pending U.S. patent application Ser. No. 09/080,635, titled "EVIDENTIARY TRAIL SYSTEM AND METHOD," filed on May 18, 1998, and which is incorporated by reference herein as if set forth in full.

In a step 1116, the security procedures including one or more of the associated policies can be updated based on the user identification and type of occurrence as indicated in steps 1104 and 1108.

Figure 12:
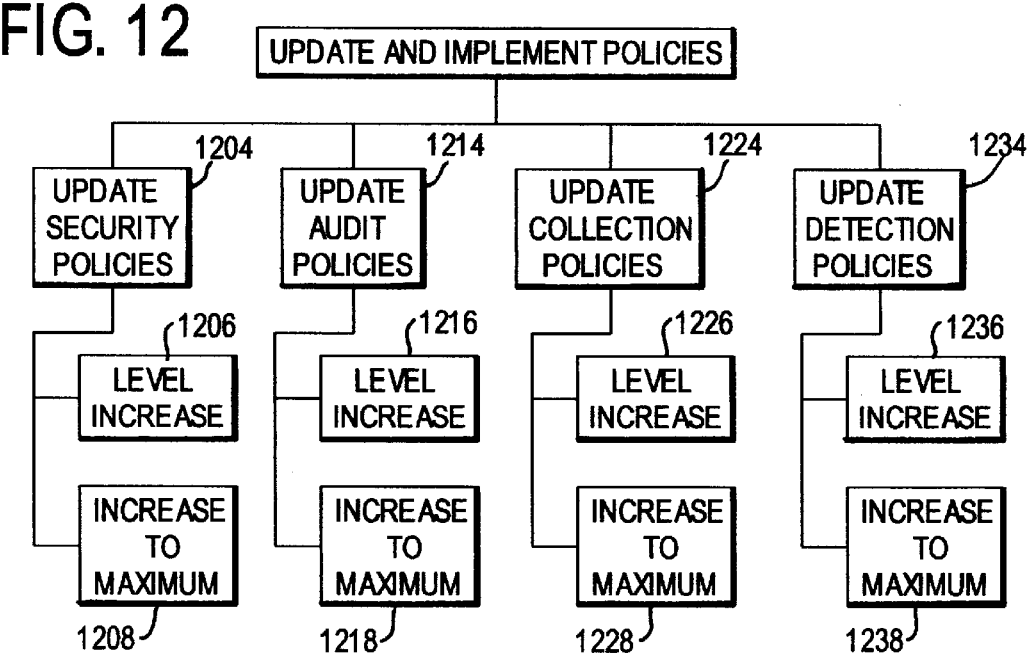
FIG. 12 is an operational flow diagram illustrating a manner in which one or more policies that make up the security procedures can be updated in accordance with one embodiment of the invention.

FIG. 12 is a diagram illustrating the manner in which one or more policies that make up the security procedures can be updated in accordance with one embodiment of the invention. As previously stated, the updates to the one or more policies can be effected automatically, or upon intervention of the security or network administrator. In one embodiment, in which the updates occur automatically, the security or network administrator can preselect or predefine a level of updates that are to occur upon the detection of a security occurrence.

In a step 1204, the security policy for the network can be updated and implemented for the identified user or group of users, for one or more computers or workstations in the computing environment, or for the entire network. In one example provided above, it may be determined that one or more unauthorized users are attempting to hack into the system. In this example, the security policy may be updated to increase the entry security procedures for the entire network. This can include, for example, decreasing the number of allowed unsuccessful log on attempts, and increasing the time period before the number of unsuccessful attempts is reset.

In another example, a user may be attempting to perform unauthorized operations, such as access restricted files. In this example, the security procedure may be updated to automatically log-off that user, or to monitor that user's activities more closely and more frequently.

In one embodiment, the increase in the one or more policies of the security procedures can be done in a step wise, iterative fashion as illustrated by block 1206. Alternatively, the increase can be set to transition immediately to the maximum security level as indicated by block 1208. For example, where a stepwise increase is selected, the level of security implemented by the security policy can be increased in a step-wise fashion to a higher level of security. In one embodiment, the step-wise increases to the next level increments one or more parameters of the policy by a predefined amount.

In an alternative embodiment, a plurality of templates for one or more policies can be defined. The policy or policies are upgraded to a higher level by selecting and implementing a higher-level or upgraded template. In this embodiment, the security administrator, for example, can create the templates as predefined security policies when configuring the security system. Thus, when a security occurrence is detected, the system can automatically transition to a designated template, or the administrator can select an upgraded template to implement.

When a security occurrence is detected, the policy is upgraded to the next level. If after the policy has been incremented to the next highest level of security, a security occurrence or occurrences are still occurring, one or more an additional increases can be implemented. This can continue until the maximum security policy settings are reached.

Alternatively, the stepwise increases can occur for a predetermined number of steps, until the settings are defaulted to the maximum security policy settings. Additionally, in one embodiment, at any time the security administrator can intervene to increase or decrease the settings, transition immediately to the maximum security policy settings, or to return to the minimum security policy settings. For significant security incidents, steps can be skipped and one or more policies immediately transitioned to the highest level.

In addition to or instead of changes to the security policy, the audit policy can be changed as indicated by block 1214. Preferably, in one embodiment, the audit policy is changed only for those users or groups of users identified in step 1104 of FIG. 11 as being associated with the particular security occurrence identified.

The audit policy can be updated to look at where those activities related to the type of occurrence identified in a step 808, as illustrated by block 1216, or to look at all activities associated with a particular user or groups of users as indicated by block 1218. As with updates to the security policy, updates to the audit policy can be set to occur incrementally, or to automatically transition to the maximum settings such that all activities or all activities of a particular type or an identified user or groups of users can be audited. Intervention by a security administrator or network administrator can be permitted in one embodiment to allow custom adjustments to be made.

Additionally, or alternatively, the collection policies can be modified as illustrated by block 1224. The collection policies can be modified for all users, or just for the user or group of users identified in step 804. The collection policies can be increased in a stepwise fashion such that the collection frequency is increased incrementally as illustrated by block 1226. Alternatively, the collection policy can be modified to transition to some predefined maximum collection frequency as illustrated by block 1228. As is the case with security policy and audit policy updates, intervention by a security administrator or network administrator can be permitted in one embodiment to allow custom adjustments to be made to the collection policy.

Additionally or alternatively, the detection policy can be modified as indicated by block 1234. In one embodiment, modification of a detection policy involves lowering the threshold or trigger levels for which a security occurrence is detected. As with other policy modifications, modification of the detection policy can be implemented in a stepwise fashion as illustrated by block 1236, or the modification can be immediately implemented to transition to the lowest threshold setting as illustrated by block 1238. As with the other policy implementations, manual intervention or overrides can be implemented by the security or network administrator.

6. Example System Implementations

Figure 13:
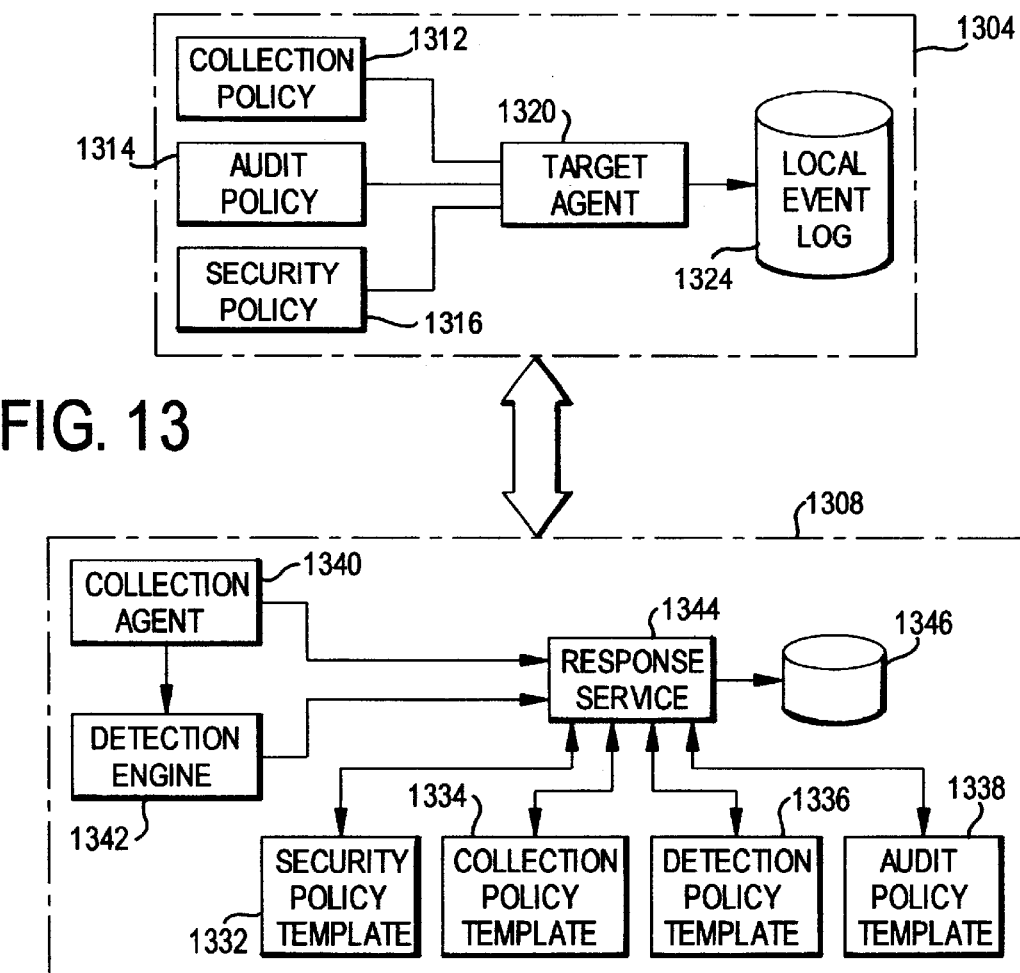
FIG. 13 is a block diagram illustrating an example architecture of a security system according to one embodiment of the invention.

Although there are numerous architectures that can be implemented to provide the security features of the present invention, two example implementations are described. FIG. 13 is a block diagram illustrating an example implementation in accordance with one embodiment of the invention. The example implementation illustrated in FIG. 13 includes two modules, an audit module 1304 and a security procedure module 1308. In one embodiment, an audit module 1304 is implemented and running on each of the computers 104 in the networked computing environment, while security procedure module 1308 can be implemented on a dedicated security console 104B.

Audit module 1304 can includes a collection policy 1312, an audit policy 1314, a security policy 1316, an audit agent 1320, and a local event log, 1324. Audit agent 1320 monitors and collects events and activities occurring in the network computing environment and stores records of these events and activities on local event log 1324. As described in detail above, security procedures, which can include the various policies, are used to define the security environment of the target 104A. Audit policy 1314 dictates the activities or operations audited and logged by audit agent 1320. Collection policy 1312 sets for the collection schedule or interval for collecting logged events and providing collected events to the detection system. Security policy 1316 sets for the security parameters for a given target or for a given user.

Security procedure module 1308 includes a collection agent 1340, a detection engine 1342 and a response service 1344. In addition, policy editors 1332, 1334, 1336, and 1338 are provided to update the one or more policies that make up the security procedures. Collection agent 1340 collects the activities and events logged by audit agent 1320 and collected in accordance with collection policy 1312.

A detection engine 1342 evaluates the collected events and activities to determine whether a security occurrence exists. For example, as described above, this can include monitoring activities to determine whether established threshold levels have been met or exceeded, whether activities are occurring out of nominal ranges, or whether unauthorized activities are attempted or performed.

If a security occurrence is detected, notification is provided to response service 1344. Response service 1344 determines what corrective action is necessary and instructs one or more of the policy editors 1332–1338 to update the policies and provide these updates to the one or more audit modules 1304 in the networked computing environment. As discussed above, the policies can be updated to incrementally increase the functionality defined by those policies or to implement those policies at the highest level of security. Additionally, an administrator such as a network administrator or security administrator can be alerted when a security incident is detected. This alert can be an audible alert or a warning flashing on a display screen of the administrator's terminal, as well as an e-mail message, page or telephone call to the administrator. The administrator can manually intervene with the security procedure module to manually select updates to the various policies. Security incident reports can be logged on a local database 1346.

After reading this description, it will become apparent to one of ordinary skill in the art how to implement the functionality of the invention utilizing alternative architectures to that described with reference to FIG. 13. For example, the functionality of collection agent 1340 and detection engine 1342 can be delegated to one or more audit modules 1304 in the networked computing environment. This decentralized collection and detection may be preferable in certain computing applications. Although other functionality of security procedure module 1308 can be decentralized and delegated to one or more audit modules 1304, it is preferable that this functionality be centralized such that a single point of control can be implemented for the networked computing environment. Also, as stated above, in a preferred embodiment each computing resource in the networked computing environment includes an audit module 1304 to track activities occurring at that resource. Security procedure module 1308 may be implemented on a dedicated security console 104B or other dedicated computing resource, or alternatively can be implemented on a computing resource that also performs additional or alternative functions within the network computing environment.

The various embodiments of the invention described above may be implemented using hardware, software or a combination thereof and may be implemented in a computer system or other processing system. In fact, in one embodiment these elements are implemented using a computer system capable of carrying out the functionality described with respect thereto.

Figure 14:
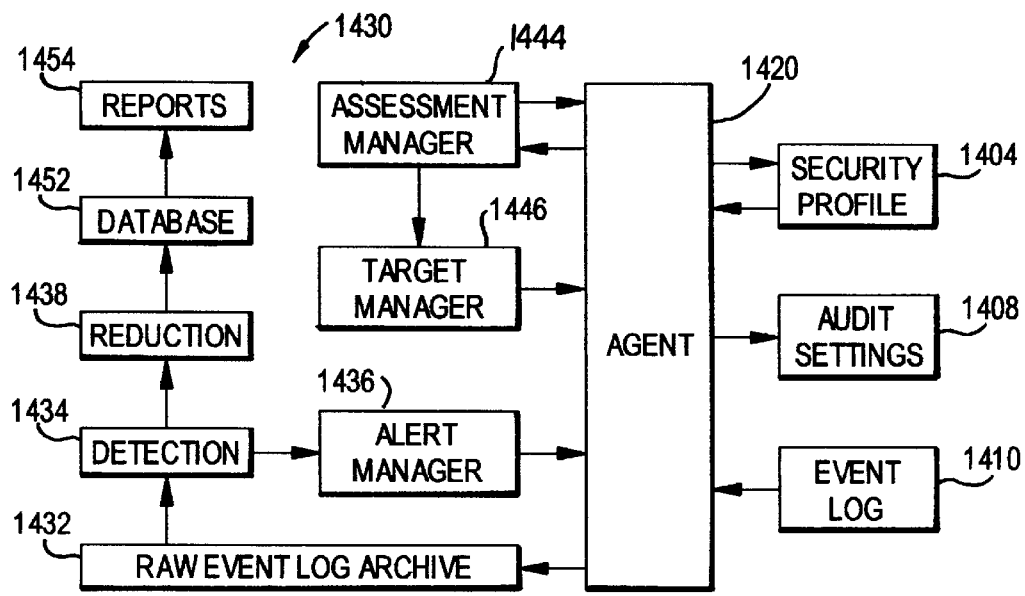
FIG. 14 is a block diagram illustrating another example architecture of a security system according to one embodiment of the invention.

FIG. 14 is a block diagram illustrating another example architecture for a security system for a computing environment according to one embodiment of the invention. The architecture illustrated in FIG. 14 includes the functionality for creating and implementing security procedures as well as the functionality for detecting security occurrences and updating the implemented security procedures in response to detected occurrences. The architecture illustrated in FIG. 14 includes a security profile 1404, audit settings 1408, and an event log 1410. In one embodiment, these elements are distributed such that they are resident on one or more of target computers 104A in a computing environment. In an alternative embodiment, one or more of these elements can be centralized at one or more security consoles 104B.

Security profile 1404 is a profile of the security of target 104A. Security profile can give an overall security standing for a target 104A as well as security posture for one or more attributes or characteristics of the target 104A. For example, attributes such as number of unsuccessful log-on attempts allowed, password aging, password length, and other settings or characteristics can each be rated with a security posture (e.g., poor, fair, good, very good, excellent). In one embodiment, these individual ratings can be combined to form an overall rating.

Audit settings 1408, in one embodiment, are the settings established by the audit policy. These can include, for example, settings for system audits, object audits, and other audits. The audit settings 1408, which reflect the audit policy, define or dictate what events are logged in event log 1410. In one embodiment, the events are logged with an indication of the date and time of the event occurrence, the source of the event, and a category of the type of event. The source can include the computer 104 associated with the event or the user associated with the event or both. Categories can include, for example, system events, log-on related events, unauthorized access attempt events, and so on. As will be apparent to one of ordinary skill in the art, event categories can be created or defined for individual environments to best indicate types of events logged.

Also illustrated in FIG. 14 is an agent 1420. In one embodiment, agent 1420 is resident on each target computer 104A. Agent 1420 can be used to update the audit settings for the audit policy, as well as to facilitate the collection of events from event log 1410. Agent 1420 can also be used to retrieve information from security profile 1404 as well as to update security profile 1404.

In the embodiment illustrated in FIG. 14, the security system also includes centralized features, preferably provided in a centralized capacity at a security workstation. Included with these centralized features can be a raw event log archive 1432. Raw event log archive 1432 is an archive of events collect from one or more event logs 1410 at one or more targets 104A. As stated above, in one embodiment, events are collected from event log 1410 based on a collection policy. Thus, raw event log archive 1432 can be considered as a data archive containing event logs from the various targets 104A. In one embodiment, each event also has a field indicating the target 104A from which is was received, and a field indicating the user associated with an event where applicable.

Detection mechanism 1434 evaluates events in raw event archive 1432 to determine whether a security occurrence or incident has occurred. If a security occurrence is detected, alert manager 1436 is notified such that the administrator can be alerted and appropriate responses put into effect. One response may be to immediately inform the agent 1420 associated with the affected target to shut down the system or to log off the user.

In one embodiment, security occurrences brought to the attention of alert manager 1436 can have an effect on the security posture in security profile 1404. For example, the security occurrence can result in alert manager 1436 downgrading the security rating of the associated target 104A.

In one embodiment, the downgrading of the security rating in a security profile 1404 is fed back to an assessment manager 1444. The downgrading can occur as a result of changes to target 104A sensed by security profile 1404, or by the agent 1420 downgrading the rating. Assessment manager 1444 evaluating the security posture of a target 104A may determine that one or more of the security procedures need to be updated to improve the security posture of the affected target 104A. Thus, assessment manager 1404 may inform a target manager 1446 to update the security procedures for the affected target 104A.

This can include an update of the audit policy 904 and the collection policy 912 to provide more frequent and/or more thorough audits of the activities associated with that target 104A. In an alternative embodiment, alert manager 1436 may immediately notify target manager 1446 upon the detection of a security occurrence that the security procedures need to be updated. In this alternative, target manager 1446 can take the steps necessary to update the security procedures appropriately.

Also illustrated in FIG. 14 is an audit reduction 1438 mechanism to reduce or distill the audit records down to a useable set of audit data. This is data that is useful for the purposes of archival or reporting and eliminates details that may not be desired or necessary for date archival or security reporting. The reduced audit records are stored in a database 1452 and made available for report generation 1454. As with the architecture illustrated in FIG. 13, the architecture illustrated in FIG. 14 also provides for distributed functionality at one or more targets 104A or associated with one or more users, as well as centralized functionality for detection of security occurrences and updating of security procedures. As stated above, the various functionalities described herein can be distributed in alternative architectures and it is not necessary that each of the functionalities shown as being distributed are, in fact, distributed in each embodiment, or that the centralized functionality must be centralized. In fact, it will become apparent to one of ordinary skill in the art after reading this description that certain of these centralized functions can in fact be distributed among the targets 104A depending on the amount of processing requirements that a system designer chooses to offload to various targets. Likewise, the distributed functions can be centralized with, perhaps, an increased requirement for communication between the centralized function and the associated targets 104A.

Figure 15:
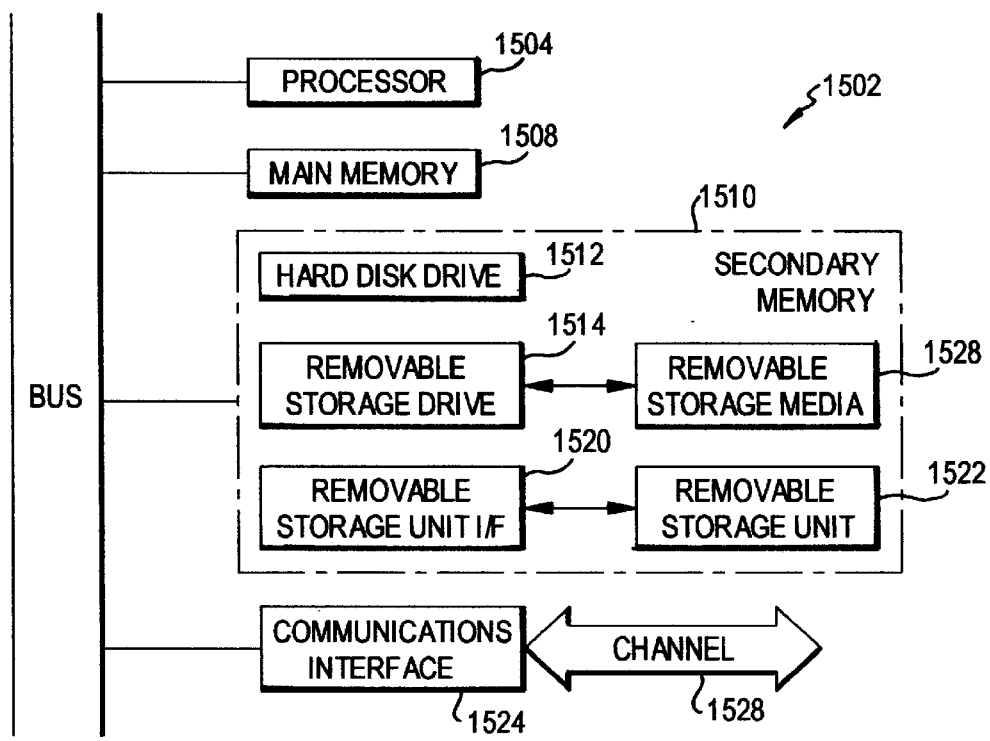
FIG. 15 is a block diagram illustrating a general purpose computer system, including examples of computer readable media for providing computer software or instructions, according to one embodiment of the invention.

FIG. 15 is a block diagram illustrating a general purpose computer system, including examples of computer readable media for providing computer software or instructions to perform the functionality described herein. The illustrated computer system 1502 includes one or more processors, such as processor 1504. The processor 1504 is connected to a communication bus 1506. Various software embodiments are described in terms of this example computer system. After reading this description, it will become apparent to a person of ordinary skill in the relevant art how to implement the invention using other computer systems or computer architectures, including, for example, the architecture illustrated in FIG. 1.

Computer system 1502 also includes a main memory 1508, preferably Random Access Memory (RAM), and can also include a secondary memory 1510. The secondary memory 1510 can include, for example, a hard disk drive 1512 and/or a removable storage drive 1514, representing a floppy disk drive, a magnetic tape drive, an optical disk drive, etc. Removable storage drive 1514 reads from and/or writes to removable storage media 1528. Removable storage media 1528, represents a floppy disk, magnetic tape, optical disk, etc., which is read by and written to by removable storage drive 1514. As will be appreciated, the removable storage media 1528 includes a computer-usable storage medium having stored therein computer software and/or data.

In alternative embodiments, secondary memory 1510 may include other similar means for allowing computer programs or other instructions to be loaded into computer system 1502. Such means can include, for example, a removable storage unit 1522 and a removable storage unit interface 1520. Examples of such can include a program cartridge and cartridge interface (such as, for example, that found in video game devices), a removable memory chip (such as, for example, an EPROM, PROM or other memory device) and associated socket, and other removable storage units 1522 and removable storage unit interfaces 1520 which allow software and data to be transferred from the removable storage unit 1522 to computer system 1502. In some embodiments, removable storage unit 1522 may be affixed permanently to removable storage unit interface 1520.

Computer system 1502 can also include a communications interface 1524. Communications interface 1524 allows software and data to be transferred between computer system 1502 and external devices. Examples of communications interface 1524 can include a modem, a network interface (such as an Ethernet card), a communications port, a PCMCIA slot and card, etc. Software and data transferred via communications interface 1524 are in the form of signals which can be electronic, electromagnetic, optical or other signals capable of being received by communications interface 1524. These signals are provided to communications interface 1524 via a channel 1528. This channel 1528 carries signals and can be implemented using a wireless medium, wire or cable, fiber optics, or other communications medium. Some examples of a channel can include a phone line, a cellular phone link, an RF link, a network, the Internet, and other communications channels.

In this document, the terms "computer program medium" and "computer usable medium" are used to generally refer to media such as removable storage media 1528, a hard disk installed in hard disk drive 1512, removable storage unit 1522 and signals on channel 1528. These terms can also refer to main memory 1508 where main memory 1508 stores a computer program or a part thereof. These computer program products are means for providing software to computer system 1502.

Computer programs or instructions (also called computer control logic) can be stored in main memory 1508 and/or secondary memory 1510. Computer programs can also be received via communications interface 1524. Such computer programs, when executed, enable the computer system 1502 to perform the features of the present invention as discussed herein. In particular, the computer programs, when executed, enable the processor 1504 to perform the features of the present invention. Accordingly, such computer programs represent controllers of the computer system 1502.

In an embodiment where the elements are implemented using software, the software may be stored in a computer program product and loaded into computer system 1502 using removable storage drive 1514, removable storage unit 1522, hard drive 1512 or communications interface 1524. The control logic (software), when executed by the processor 1504, causes the processor 1504 to perform the functions of the invention as described herein.

In another embodiment, the elements are implemented primarily in hardware using, for example, hardware components such as Application Specific Integrated Circuits (ASICs). Implementation of the hardware state machine so as to perform the functions described herein will be apparent to persons of ordinary skill in the relevant art(s). Although not a "computer program" in the traditional sense, the hardware components can be thought of as a computer program medium (albeit, perhaps hard-wired) which enables the system to perform the described functions. In yet another embodiment, elements are implemented using a combination of both hardware and software. In this embodiment, the combination of the hardware and software can likewise be thought of as a computer program medium that enables the system to perform the described functions.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for managing security occurrences in a networked computing environment having one or more target computing systems, comprising:

means for defining security procedures in the network computing environment, wherein said security procedures include an audit policy, a collection policy, a detection policy, and a security policy;

means for implementing said defined security procedures at said one or more target computing systems a target agent associated with said one or more target computing systems, said target agent being configured to monitor activities in a networked computing environment in accordance with said security procedures and to maintain records of said activities in a local event log file;

a detection engine configured to collect said activities from said target agent and to determine whether a security occurrence is occurring based on said collected activities; and a response service configured to update said security procedures in response to a detected security incident;

wherein said means for implementing said defined security procedures is further configured to implement said updated security procedures.

2. The system of claim 1, wherein said updated security procedures comprise an updated collection policy.

3. The system of claim 1, wherein said updated security procedures comprise an updated audit policy.

4. The system of claim 3, wherein the audit policy comprises an identification of files to be audited.

5. The system of claim 4, wherein the identification of the files to be audited comprises an identification of at least some of the files to be audited using wild cards.

6. A method for managing security incidents in a computing environment, comprising:

defining security procedures, wherein said security procedures include one or more policies;

implementing said security procedures on one or more computing systems in the computing environment;

detecting a security incident using said implemented security procedures;

updating said security procedures in response to said detected security incident; and implementing said updated security procedures on at least one of said one or more computing systems;

wherein said one or more security procedures comprise at least one of a security policy, an audit policy, a collection policy and a detection policy.

7. The method of claim 6, wherein said step of updating said security procedures comprises the step of incrementing a level of one or more policies that make up said security procedures.

8. The method of claim 6, wherein said step of updating said security procedures comprises the step of increasing to a maximum a level of one or more policies that make up said security procedures.

9. The method of claim 6, wherein said step of implementing said updated security procedures comprises the step of implementing said updated security procedures for an identified user or group of users.

10. The method of claim 6, wherein said step of detecting a security incident comprises the steps of:

monitoring activities on one or more computing systems in the computing environment in accordance with said security procedures; and determining whether said monitored activities exceed a predefined level of acceptability.

11. The method of claim 10, wherein said step of detecting a security incident further comprises the step of determining a user or group of users associated with the security incident are identified.

12. The method of claim 10, wherein said step of detecting a security incident further comprises the step of determining a type of breach or potential breach.

13. The method of claim 10, wherein said step of determining comprises the step of analyzing patterns of activities for particular users.

14. The method of claim 10, wherein said step of determining comprises the step of determining whether a number of monitored occurrences exceeds a predefined limit.

15. The method of claim 6, wherein said step of detecting a security incident further comprises the step of notifying an administrator of the security incident.

16. The method of claim 6, wherein said updated security procedures comprise an updated collection policy.

17. The method of claim 6, wherein said updated security procedures comprise an updated audit policy.

18. The method of claim 17, wherein the audit policy comprises an identification of files to be audited.

19. The method of claim 18, wherein the identification of the files to be audited comprises an identification of at least some of the files to be audited using wild cards.

20. A system for managing security incidents in a computing environment, comprising:

a security system configured to define and implement security procedures in the computing environment;

a detection system configured to detect security incidents in the computing environment in accordance with said security procedures; and a response system configured to update said security procedures in response to a detected security incident and to cause said security system to implement said updated security procedures in the computing environment;

wherein said security procedures comprise at least one of a security policy, an audit policy, a collection policy and a detection policy.

21. The system of claim 20, wherein said updated security procedures comprise an updated collection policy.

22. The system of claim 20, wherein said updated security procedures comprise an updated audit policy.

23. The system of claim 22, wherein the audit policy comprises an identification of files to be audited.

24. The system of claim 23, wherein the identification of the files to be audited comprises an identification of at least some of the files to be audited using wild cards.

25. A system for managing security incidents in a computing environment, comprising:

means for defining security procedures, wherein said security procedures include one or more policies;

means for implementing said security procedures on one or more computing systems in the computing environment;

means for detecting a security incident using said implemented security procedures;

means for updating said security procedures in response to said detected security incident; and means for implementing said updated security procedures on at least one of said one or more computing systems;

wherein said one or more policies comprise at least one of a security policy, an audit policy, a collection policy and a detection policy.

26. The system of claim 25, wherein said updated security procedures comprise an updated collection policy.

27. The system of claim 25, wherein said updated security procedures comprise an updated audit policy.

28. The system of claim 27, wherein the audit policy comprises an identification of files to be audited.

29. The system of claim 28, wherein the identification of the files to be audited comprises an identification of at least some of the files to be audited using wild cards.

30. A computer program medium embodying a program of instructions for causing a computer system to perform method steps of managing security incidents in a computing environment, said method steps comprising the steps of:

defining security procedures, wherein said security procedures include one or more policies;

implementing said security procedures on one or more computing systems in the computing environment;

detecting a security incident using said implemented security procedures;

updating said security procedures in response to said detected security incident; and implementing said updated security procedures on at least one of said one or more computing systems;

wherein said one or more policies comprise at least one of a security policy, an audit policy, a collection policy and a detection policy.

31. The computer program medium of claim 30, wherein said updated security procedures comprise an updated collection policy.

32. The computer program medium of claim 30, wherein said updated security procedures comprise an updated audit policy.

33. The computer program medium of claim 32, wherein the audit policy comprises an identification of files to be audited.

34. The computer program medium of claim 33, wherein the identification of the files to be audited comprises an identification of at least some of the files to be audited using wild cards.

35. A system for managing security incidents in a computing environment which comprises one or more computing systems, said system comprising:

means for implementing security procedures in said computing environment;

means for detecting a security incident using said implemented security procedures;

means for updating said security procedures in response to said detected security incident; and means for implementing said updated security procedures on at least one of said one or more computing systems;

wherein said implemented security policies comprise at least one of a security policy, an audit policy, a collection policy and a detection policy.

36. The system of claim 35, wherein said updated security procedures comprise an updated collection policy.

37. The system of claim 35, wherein said updated security procedures comprise an updated audit policy.

38. The system of claim 37, wherein the audit policy comprises an identification of files to be audited.

39. The system of claim 38, wherein the identification of the files to be audited comprises an identification of at least some of the files to be audited using wild cards.

40. A system for managing security occurrences in a network computing environment having one or more target computing systems, comprising:

means for defining security procedures in the network computing environment, wherein said security procedures include at least one of a security policy, an audit policy, a collection policy and a detection policy;

means for implementing said defined security procedures at said one or more target computing systems an target agent associated with said one or more target computing systems, said target agent being configured to monitor network activities in accordance with said security procedures and to maintain records of said network activities in a local event log file;

a detection engine configured to collect said network activities from said target agent and to determine whether a security incident is occurring based on said collected network activities; and a response service configured to update said security procedures in response to a detected security incident;

wherein said means for implementing said defined security procedures is further configured to implement said updated security procedures.

* * * * *